US010439919B2

(12) United States Patent
Coleman et al.

(10) Patent No.: US 10,439,919 B2
(45) Date of Patent: Oct. 8, 2019

(54) REAL TIME EVENT MONITORING AND ANALYSIS SYSTEM

(71) Applicant: BRITE:BILL LIMITED, Dublin (IE)

(72) Inventors: Alan Coleman, Malahide (IE); James Hannon, Drumcondra (IE); Jerome O'Flaherty, Celbridge (IE)

(73) Assignee: BRITE:BILL LIMITED, Dublin (IE)

( * ) Notice: Subject to any disclaimer, the term of this patent is extended or adjusted under 35 U.S.C. 154(b) by 310 days.

(21) Appl. No.: 15/303,516

(22) PCT Filed: Apr. 10, 2015

(86) PCT No.: PCT/EP2015/057876
§ 371 (c)(1),
(2) Date: Oct. 11, 2016

(87) PCT Pub. No.: WO2015/155346
PCT Pub. Date: Oct. 15, 2015

(65) Prior Publication Data
US 2017/0034035 A1 Feb. 2, 2017

(30) Foreign Application Priority Data

Apr. 11, 2014 (EP) .................................... 14164476
Apr. 11, 2014 (EP) .................................... 14164478
Apr. 11, 2014 (EP) .................................... 14164483

(51) Int. Cl.
*H04L 12/26* (2006.01)
*H04L 29/08* (2006.01)
(Continued)

(52) U.S. Cl.
CPC ........... *H04L 43/12* (2013.01); *G06Q 10/067* (2013.01); *G06Q 30/0201* (2013.01);
(Continued)

(58) Field of Classification Search
CPC ......... H04L 43/12; H04L 41/14; H04L 43/08; H04L 67/22; H04L 67/2842; H04L 67/02; H04L 67/146
See application file for complete search history.

(56) References Cited

U.S. PATENT DOCUMENTS 7,729,942 B2 * 6/2010 Jensen ................... G06Q 30/02
705/14.49
7,801,761 B2 * 9/2010 Varadarajan ....... G06Q 10/0639
705/7.29
(Continued)

FOREIGN PATENT DOCUMENTS

WO 03009175 A1 1/2003

OTHER PUBLICATIONS

International Search Report and Written Opinion from International Application No. PCT/EP2015/057876, dated Jun. 19, 2015.

*Primary Examiner* — Philip J Chea
*Assistant Examiner* — Robert B McAdams
(74) *Attorney, Agent, or Firm* — Zilka-Kotab, P.C.

(57) ABSTRACT

A system (1) has propensity models (4), and a controller (5) for automatically supplying key event data for user interactions with a network. The key event data is distributed asynchronously around a network to the model systems (4). The model systems (4) use the key event data and user data from subscriber systems to generate subscriber analysis outputs such as propensity to take one of a set of pre-configured actions. The probed data includes usage, charging, and purchase history data. The models are weighted sub-models, in which weights are based on user segment.

19 Claims, 5 Drawing Sheets

(51) Int. Cl.
*G06Q 30/02* (2012.01)
*G06Q 10/06* (2012.01)
*H04L 12/24* (2006.01)

(52) U.S. Cl.
CPC ......... *G06Q 30/0204* (2013.01); *H04L 41/14* (2013.01); *H04L 43/08* (2013.01); *H04L 67/22* (2013.01); *H04L 67/2842* (2013.01); *H04L 67/02* (2013.01); *H04L 67/146* (2013.01)

(56) References Cited

U.S. PATENT DOCUMENTS

| | | |
|---|---|---|
| 8,265,992 B1 | 9/2012 | Seshadri et al. |
| 8,478,709 B2 | 7/2013 | Tang et al. |
| 8,630,892 B2 | 1/2014 | Bhalla et al. |
| 8,694,401 B2 | 4/2014 | Stewart |
| 8,712,828 B2 | 4/2014 | Maga et al. |
| 9,986,089 B2 * | 5/2018 | Gilbert ................ H04M 3/5141 |
| 2003/0200135 A1 * | 10/2003 | Wright ................... G06Q 30/02 705/7.29 |
| 2009/0254971 A1 * | 10/2009 | Herz ...................... G06Q 10/10 726/1 |
| 2013/0073400 A1 * | 3/2013 | Heath .................... G06Q 30/02 705/14.73 |
| 2014/0310159 A1 | 10/2014 | Zoldi et al. |

\* cited by examiner

REAL TIME EVENT MONITORING AND ANALYSIS SYSTEM

FIELD OF THE INVENTION

The invention relates to monitoring events associated with subscribers in a communications network, and processing resultant data to cause actions to take place. It relates particularly to network where there are millions of subscribers and a consequent high level of network traffic.

PRIOR ART DISCUSSION

U.S. Pat. No. 8,478,709 (Hewlett-Packard) describes a method of evaluating clients in which client data is received and a statistical model is used to calculate a likelihood of client churn. In the statistical model a churn-type event is encoded as an absorbing state of a stochastic process.

U.S. Pat. No. 8,712,828 (Accenture) describes a system with a data mart, in which derived values indicative of a customer characteristic are calculated, and a data mining function returns results identifying clusters of customers sharing common customer attributes.

US2014/0310159 (FAIR ISAAC Corp.) describes a system which determines propensity scores for customers and combines them in a fraud model.

U.S. Pat. No. 8,694,401 (Lenddo Limited) describes a system which analyses interactions with a social network.

U.S. Pat. No. 8,630,892 (Accenture) describes a system which analyses customer interactions to determine a customer experience block.

U.S. Pat. No. 8,265,992 (Sprint Communications) describes processing of data relating to communication between mobile device pairs.

The invention is directed towards generating improved data about subscribers in communications network where there are volumes of traffic typically exceeding.

SUMMARY OF THE INVENTION

According to the invention, there is provided an analysis system comprising:
  passive data probes,
  at least one filter configured to perform real time filtering of data from the probes to provide key event data representing key events for interaction of subscribers with an organisation on a plurality of communication channels, and
  at least one processor configured to receive said key event data and to process said data to generate subscriber analysis data,
  wherein the processor is configured to use said key event data and data from data stores for historical billing data and subscriber profiles to generate said subscriber analysis data.

In one embodiment, said key events are events which contribute to propensity of a subscriber to take an action selected from a group of configured actions and the processor is configured to generate and maintain predictive models, at least some of said models being propensity models modelling propensity of users to perform said actions.

In one embodiment, and said models include:
  values for key events, for user historical activity, and for subscribe trends, and
  weightings applied to said values according to customer segment as determined by the processor.

In one embodiment, at least some of the probes are configured to generate event data messages and to forward said messages asynchronously to the processor. In one embodiment, the probes are mobile network probes and are configured to use a MAP extension to a signalling standard level.

In one embodiment, the probes and/or the filters are configured to detect as being indicative of events: sequences of characters, session cookies, and requests to particular Web pages. In one embodiment, the processor is configured to maintain a plurality of caches for processing incoming key event data. Preferably, said caches include a first cache for event data received during a most recent configured time period, and at least one further cache for event data which has been centrally filtered as being relevant for analysis. In one embodiment, the processor is the processor is configured to transfer data from the first cache to the second cache according to level of a parameter rising above a threshold. Preferably, at least some models are per-subscriber.

In one embodiment, at least some of the models are tree-structured with inter-linked nodes. In one embodiment, the processor is configured to use a distributed hashing algorithm to find a node which updates a propensity model in real-time, using an initial lookup of a subscriber's segment to select the appropriate node. In one embodiment, each node in each propensity model includes a current segmentation model which both feeds the model for the user associated with the network event and provides feedback to update a segmentation model.

In one embodiment, the processor is configured to perform pattern aggregation of data from a plurality of data sources of user data over time, to normalize said patterns, and to perform segmentation-based weighting in said models. In one embodiment, the processor is configured to create and maintain a data analysis model by combining weighted sub-models. Preferably, the sub-models are created by either utilizing weighted sub-sub-models or by using aggregated values, and wherein the models work in the temporal domain so that each propensity model is a future prediction based on combined and weighted data over time.

In one embodiment, the processor is configured to update a model in real time by caching individual elements of the model for an active subscriber, and to in real time feed updated values into algorithms to generate new propensity values for the active subscriber. In one embodiment, the processor is configured to use configurable weightings per subscriber segment in said models.

In one embodiment, the processor is configured to use data received from network systems to monitor subscriber usage, charging, profile and purchase history over time and then combine these variables to assign a subscriber to one of particular set of subscriber segments, and to use said segment assignment for said analysis. In one embodiment, the processor includes a real time decisioning component. In one embodiment, the processor is configured to identify key events in current subscriber sessions.

In one embodiment, the processor is configured to identify key events in recent interactions.

In one embodiment, the processor is configured to identify facts from the events, and to use the facts for executing rules. In one embodiment, the process is configured to maintain a distributed cache of facts including cache nodes in which each cache node is configured to update triggers for an automatic update of the other cache nodes.

In one embodiment, the processor is configured to dynamically maintain the cache with facts for only a selected sub-set of subscribers. In one embodiment, the processor is configured to perform eventual consistency whereby all processing nodes within a distributed cluster of processing nodes are updated at a point in time, wherein the processor is configured to detect that values of facts may be out of date while the nodes are being made consistent in the background.

Preferably, the processor is configured to recognize as a key event a subscriber interacting with pages within a Web site, and to consequently determine that an update is required to a decisioning rule. In one embodiment, the processor is configured to automatically provide a pre-configured message for that subscriber.

In one embodiment, the system further comprises a subscriber profile database, and the data processor is configured to monitor said event data to identify events indicative of subscriber sentiment.

In one embodiment, the processor is configured to generate per-subscriber trends, in which more recent events have higher applied weightings than older events. In one embodiment, the processor is configured to quantify sentiment of a subscriber. In one embodiment, the processor is configured to trigger actions when sentiment levels reach thresholds. In one embodiment, the processor is configured to filter incoming events in real time to determine if they give rise to a need to re-calculate a sentiment level. In one embodiment, said filtering includes applying a relevance weighting. In one embodiment, the processor is configured to generate a sentiment analysis output for a full organization.

In one embodiment, the processor is configured to store a sum of events and weightings for each user, with the time (t) left as a variable. In one embodiment, the processor is configured to determine that more positive recent events mean a larger value for sentiment and more negative recent events mean a larger negative value for sentiment. In one embodiment, the processor is configured to apply to more recent events higher weightings than for older events.

In another aspect, the invention provides computer readable medium comprising non-transitory software code for performing operations of an analysis system of any preceding claim when executing on a digital processor.

According to the invention, there is provided an analysis system comprising mobile network probes and Internet probes and at least one processor adapted to receive event data from the probes and to process said data to generate analysis data.

In one embodiment, the system comprises a filter for filtering the network probe data. In one embodiment, the processor is adapted to generate models to predict trends. In one embodiment, at least some models are per-subscriber.

In one embodiment, at least some models are propensity models. In one embodiment, the network probes are adapted to filter key events associated with a user's profile in real-time. In one embodiment, at least some of the probes are adapted to generate event data messages and to forward said messages asynchronously to the processor.

In one embodiment, the processor comprises at least one server. In one embodiment, the propensity models are tree-structured. In one embodiment, at least some of the filters are adapted to distinguish key events in real-time from signalling-level network events.

In one embodiment, said key event are any events which contribute to propensity of a subscriber to take an action selected from a group of configured actions. In one embodiment, the processor is adapted to maintain a plurality of caches for processing incoming event data.

In one embodiment, said caches include a first cache for event data received during the most recent configured time period, and at least one further cache for event data which has been centrally filtered as being relevant for analysis. In one embodiment, the processor is adapted to refresh the second cache from a subscriber profile database.

In one embodiment, the processor is adapted to transfer data from the first cache to the second cache according to level of a parameter rising above a threshold. In one embodiment, the probes are passive. In one embodiment, probes are adapted to use a MAP extension to a signalling standard level.

In one embodiment, the probes and/or the filters are adapted to detect as being indicative of events: sequences of characters, session cookies, requests to particular Web pages.

In one embodiment, the processor is adapted to use a distributed hashing algorithm to find a node which updates a propensity model in real-time, using an initial lookup of a subscriber's segment to select the appropriate node. In one embodiment, each node in each propensity model has a current segmentation model which both feeds the propensity model for the user associated with the network event and provides feedback to update a segmentation model. In one embodiment, the processor is adapted to perform propensity scoring. In one embodiment, the processor is adapted to perform pattern aggregation patterns within a plurality of data sources of user data over time, to normalize these patterns, and to project predicted values using segmentation-based weighting around these patterns to derive a propensity score.

In one embodiment, the processor is adapted to create and maintain a propensity model by combining weighted sub-models. In one embodiment, the sub-models are created by either utilizing weighted sub-sub-models or by using aggregated values, wherein the models work in the temporal domain so that each propensity model is a future prediction based on combined and weighted data over time.

In one embodiment, the processor is adapted to update the propensity model in real time by caching individual elements of the propensity model for an active subscriber as detected by the probe and in real time feed updated values into algorithms to generate new propensity values for the active subscriber. In one embodiment, the processor is adapted to use configurable weightings per subscriber segment. In one embodiment, the processor is adapted to dynamically perform subscriber segmentation.

In one embodiment, the processor is adapted to monitor subscriber usage, charging, profile and purchase history over time and then combine these variables to assign a customer to one of particular set of customer segments.

In one embodiment, the processor is adapted to calculate for each individual component of the segmentation model a confidence value for a propensity trend.

In another aspect, the invention provides a computer readable medium comprising software code for performing operations of an analysis system as defined above in any embodiment when executing on a digital processor.

In another aspect, the invention provides a method for operation of a processor of an analysis system comprising mobile network probes and Internet probes, the method comprising receiving event data from the probes and processing said data to generate analysis data.

In one embodiment, the system filters the network probe data. In one embodiment, the processor generates models to predict trends, and at least some models are per-subscriber, and may be propensity models. In one embodiment, the network probes filter key events associated with a user's profile in real-time, and at least some of the probes generate event data messages and forward said messages asynchronously to the processor.

At least some of the filters may distinguish key events in real-time from signalling-level network events, and said key events may be any events which contribute to propensity of a subscriber to take an action selected from a group of configured actions. The processor may maintain a plurality of caches for processing incoming event data.

The method may include any or a combination of the steps performed by the system as defined above in any embodiment.

According to the invention in another aspect, there is provided a data analysis system comprising probes, a subscriber profile database, and a data processor adapted to monitor data detected by the probes and to process said data to identify events indicative of subscriber sentiment.

In one embodiment, the processor is adapted to monitor trends indicative of subscriber sentiment. In one embodiment, the processor generates per-subscriber trends, in which more recent events have higher applied weightings than older events.

In one embodiment, the processor is adapted to quantify sentiment of a subscriber. In one embodiment, the processor is adapted trigger actions when sentiment levels reach thresholds.

In one embodiment, the processor is adapted to filter incoming events in real time to determine if they give rise to a need to re-calculate a sentiment level. In one embodiment, said filtering includes applying a relevance weighting.

In one embodiment, the processor is adapted to generate a sentiment analysis output for a full organization.

In one embodiment, the processor is adapted to store a sum of events and weightings for each user, with the time (t) left as a variable.

In one embodiment, the processor is adapted to determine that more positive recent events mean a larger value for sentiment and more negative recent events mean a larger negative value for sentiment.

In one embodiment, the processor is adapted to apply to newer events higher weightings than for older events.

According to the invention in another aspect, there is provided a method of operation of a data analysis system comprising probes, a subscriber profile database, and a data processor, the method comprising the data processor monitoring data detected by the probes and processing said data to identify events indicative of subscriber sentiment.

In one embodiment, the processor monitors trends indicative of subscriber sentiment. In one embodiment, the processor generates per-subscriber trends, in which more recent events have higher applied weightings than older events.

In one embodiment, the processor quantifies sentiment of a subscriber. In one embodiment, the processor triggers actions when sentiment levels reach thresholds. The processor may filter incoming events in real time to determine if they give rise to a need to re-calculate a sentiment level, and said filtering may include applying a relevance weighting.

In one embodiment, the processor generates a sentiment analysis output for a full organization.

In one embodiment, the processor stores a sum of events and weightings for each user, with the time (t) left as a variable. Also, it may determine that more positive recent events mean a larger value for sentiment and more negative recent events mean a larger negative value for sentiment, and it may apply to newer events higher weightings than for older events.

According to the invention in another aspect, there is provided a real time decisioning system comprising data probes and a data processor, wherein the processor is adapted to identify events from the probes in real time and to generate subscriber outputs with relevant and contextual information.

In one embodiment, the processor is adapted to identify events in current subscriber sessions. In one embodiment, the processor is adapted to identify events in recent interactions.

In one embodiment, the processor is adapted to identify events in historical billing data.

In one embodiment, the processor is adapted to identify facts from the events, and to use the facts for executing rules. In one embodiment, the processor is adapted to maintain a distributed cache of facts. In one embodiment, each cache node is adapted to update triggers for an automatic update of the other cache nodes. In one embodiment, the processor is adapted to dynamically maintain the cache with facts for only a selected sub-set of subscribers.

In one embodiment, the processor is adapted to perform eventual consistency whereby all nodes within a distributed cluster are updated at a point in time. In one embodiment, the processor is adapted to detect that values of facts may be out of date while the nodes are being made consistent in the background.

In one embodiment, the system comprises filters.

In one embodiment, the processor is adapted to use data from filters for capturing all Web traffic coming into an organization's Website.

In one embodiment, the filters have a configuration which recognizes a connecting user (e.g. via a session cookie) and based on the user interacting with pages within the Web site determine that an update is required to a decisioning rule.

In one embodiment, a filter is adapted to detect user interaction with a Web site, and the processor is adapted to update decisioning to show a pre-configured message for that user.

According to the invention in another aspect, there is provided method performed by a real time decisioning system comprising data probes and a data processor, the method comprising identifying events from the probes in real time and generating subscriber outputs with relevant and contextual information.

In one embodiment, the processor identifies events in current subscriber sessions and/or in recent interactions, and/or in historical billing data.

In one embodiment, the processor identifies facts from the events, and uses the facts for executing rules. The processor may maintain a distributed cache of facts. In one embodiment, each cache node updates triggers for an automatic update of the other cache nodes, and the processor may dynamically maintain the cache with facts for only a selected sub-set of subscribers.

In one embodiment, the processor performs eventual consistency whereby all nodes within a distributed cluster are updated at a point in time. In one embodiment, the processor detects that values of facts may be out of date while the nodes are being made consistent in the background.

In one embodiment, the processor uses data from filters for capturing all Web traffic coming into an organization's Website.

In one embodiment, the filters recognize a connecting user (e.g. via a session cookie) and based on the user interacting with pages within the Web site indicate that an update required to a decisioning rule.

In one embodiment, a filter detects user interaction with a Web site, and the processor updates decisioning to show a pre-configured message for that user.

BRIEF DESCRIPTION OF THE DRAWINGS

The invention will be more clearly understood from the following description of some embodiments thereof, given by way of example only with reference to the accompanying drawings in which:—

DETAILED DESCRIPTION OF THE INVENTION

Figure 1:
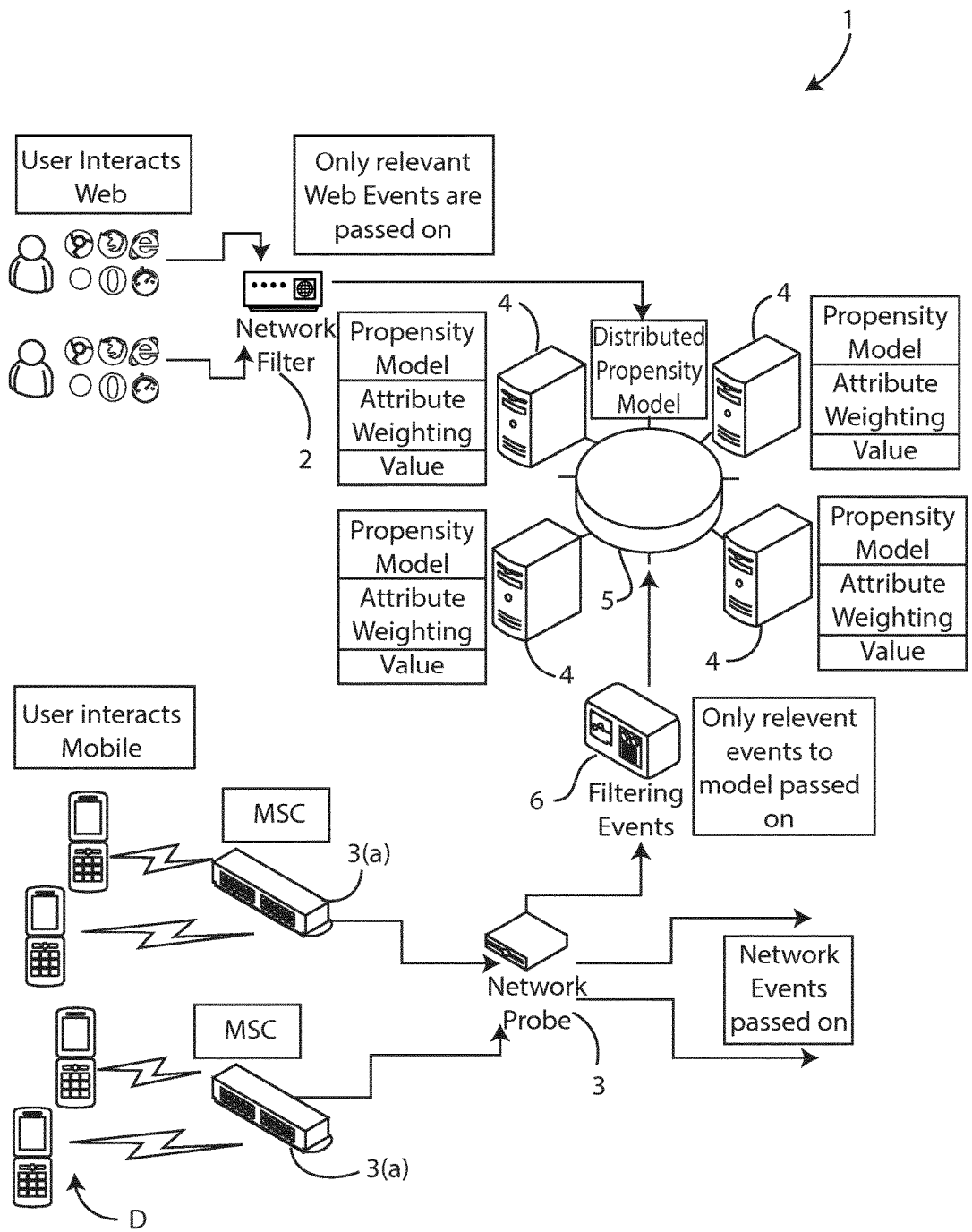
FIG. 1 is a block diagram illustrating a system for probing of events in a mobile network and generating updating propensity models.

Referring to FIG. 1 a system 1 of the invention comprises wide area network filters 2 and mobile network probes 3 linked with MSCs 3(a). The probes 3 are linked with network mobile switching sub-systems (MSCs) 3(a) which interface with mobile devices D used by network subscribers.

The system 1 also comprises multiple tree-based propensity model systems 4. There is also a controller 5 for automatically updating the models 4. The system 1 also comprises a filter 6 for the mobile network events (this functionality is built into the network filter 2).

In general terms the system has passive data probes and filters programmed to perform real time filtering of data from the probes to provide key event data representing key events for interaction of subscribers with an organisation such as a telecom operator. This is done on multiple communication channels. At least one processor is programmed to receive the key event data and to process this data to generate subscriber analysis data, and to use the key event data and data from data stores for historical billing data and subscriber profiles to generate the subscriber analysis data.

The filters 2 and the probes 3 automatically filter key events associated with a user's profile in real-time. The filtered events are then distributed asynchronously around a network to update the (tree-based) propensity models 4. Advantageously, the system has the ability to recognise key user events in real-time from 'normal' SS7 network events. Examples are calls or messages which increase or decrease the propensity to some action.

The systems 4 use billing and profile data of subscribers along with the detected user events to generate predictive outputs such as propensity of the user to perform an action such as churning, upgrading, or buying additional services or products.

The user interacts with the mobile network using mobile or Web channels. The network probes 3 and the network filters 2 automatically detect network events, and the controller 5 immediately filters for relevant events for the propensity model systems 4. It updates the propensity models in an eventually consistent fashion—ready for systems in real-time to query a user's propensity to perform an action.

Dynamic Caches

The network filters 2 and the network probes 3 capture 'real-time' event data from registered users (typically network subscribers). The controller 5 also captures users' profiles and these are loaded into a distributed cache component. The distributed caching component utilizes two levels of caching:

a top level cache for recently data such as numbers, i.e. numbers the system has detected within the previous XXX minutes (configurable), and a second level of cache for active users who the system will monitor.

Having the two-level cache negates the need for a database lookup. The second level cache periodically refreshes itself from the user profile database. Once a threshold in the second level cache is reached the processor moves it to the first level cache for efficiency. It lasts in the first level cache for YYY minutes of activity and is then removed from the first cache.

Real-time Event Detection

The network probes 3 are passive telecoms network monitors which capture user events, which use MAP extension to the SS7 signalling standard, TI-SCCP or SIGTRAN, to plug directly into the network. The controller 5 decodes from the network traffic 'A' numbers and also 'B' numbers (e.g. Customer Care numbers). The controller 5 monitors these network and device numbers and according to detected patterns it pushes data as a key indicator of propensity changes to the distributed propensity models.

There are two separate Web filters 2, one for Apache™ (for capturing all web traffic coming into an organizations web site) and a second J2EE filter (for specific filtering of customer self-service and customer care content). Both these filters have a configuration which recognizes a connecting user (e.g. via a session cookie) and filter requests to particular pages on the Web. The controller 5 uses this information to distribute data to the propensity systems 4. Once the controller 5 sees 'requests' (mobile and Web) matching set filtering criteria it immediately pushes a separate asynchronous event downstream component, which updates the distributed propensity model in, real time. The controller 5 uses a distributed hashing algorithm to find a node which updates the relevant propensity model in real-time, using an initial lookup of the user's segment to select the appropriate node.

Propensity Models 4

Each node in each distributed propensity model 4 has a current segmentation model which both feeds the propensity model for the user associated with the network event and provides feedback to update the overall segmentation model.

The controller 5 and the model systems 4 perform propensity scoring by aggregating patterns within various sources of user data over time, normalizing these patterns, projected predicted values, and using segmentation based weighting around these patterns to derive a propensity score. The system uses difference patterns to identify and use as building blocks for the various propensity models.

In one embodiment the propensity models are:

Propensity to contact customer care

Propensity to churn

Propensity to buy a product or upgrade an account

Each of these propensity models is created by combining weighted sub-models. These sub-models themselves are created by either utilizing weighted sub-sub-models or by using appropriate aggregated values. These models all work in the temporal domain, and ultimately each propensity model is a future prediction for a customer based on the appropriately combined and weighted data over time.

To update these models in real time the system caches the individual elements of the propensity model for the active user (the user the system has detected via the probes 2 or 3). This may be changed by the activity detected via the probe. In real time the system feeds updated value into the algorithms described below to generate new propensity values for the active customer.

For example, the "Propensity to contact Customer Care" is made up of the customer's satisfaction model rating, customer lifecycle, customer care interaction history, and network related factors. A customer's satisfaction model rating itself is typically made up of different other factors, including satisfaction survey results (in the customer's segment), customer's negative experience (from customer feedback), and customer loyalty rating (either provided by external system or derived from other data).

Ultimately, each 'building block' model 4 is derived from different aspects of the consumer behaviour, various customer-orientated segmented datasets, and datasets derived from industry trends.

So, for example this works like:

Propensity model to contact Customer Care in next month ($M^1$)

$$P^{cc} = W^1 * CustomerSat(M^1) +$$
$$W^2 * CustomerLifeCycle(M^1) + W^3 * CustomerEngagement(M^1) +$$
$$W^4 * RecentNetworkTrend(M^1) + W^5 * SeasonalTrends(M^1)$$

The trend values are for example derived from customer billing data. Where the $W^{1/2/3/4/5}$ are different weightings configurable depending on the client, for example, each of these weightings will probably be different for each customer segment, e.g. a teenager will have different weightings for these elements than a pensioner.

Each of these five factors within this propensity model are 'trends' which can be interpolated forward in time to derive a future value for each.

Figure 2:
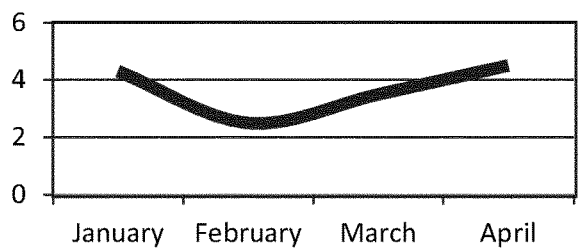
FIGS. 2 to 4 are automatically-generated plots generated by the system to illustrate trends in customer criteria.
Figure 3:
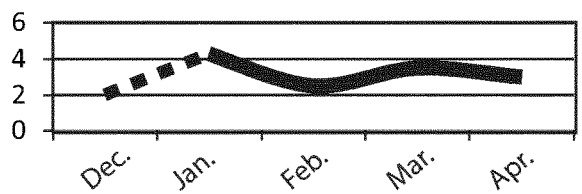

"CustomerSat" might be represented as shown in FIG. 2. Assuming the trend continues the May value for Customer Sat will be 5. The customer lifecycle may be represented as shown in FIG. 3.

In this example, a customer has renewed his contract in January and is going through a typical lifecycle with the network operator, i.e. depending on how long a customer has been with the current operator and how far into the current contract affects a customer's propensity to contact customer care.

Figure 4:
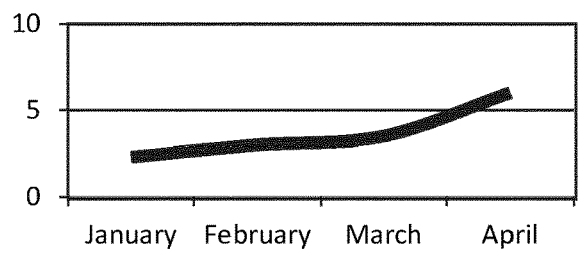

Customer engagement trends are shown in FIG. 4. This user is showing a higher level of engagement (and usage) of the service and therefore may have a higher propensity to engage with customer care in the future.

In this model there is a non-specific customer-related factor, how well the network has been running. For example, if there have recently been network outages or speed or coverage of the network is suffering can affect all customers' propensity to call. This again needs to be weighted by segment as some segments of customers may be more affected by issues such as network coverage while others might be affected by network slowdowns.

Figure 5:
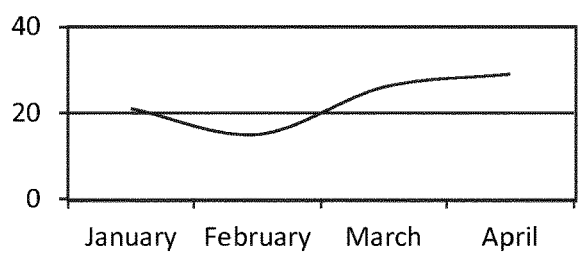
FIGS. 5 and 6 are automatically-generated plots illustrating global trends.
Figure 6:
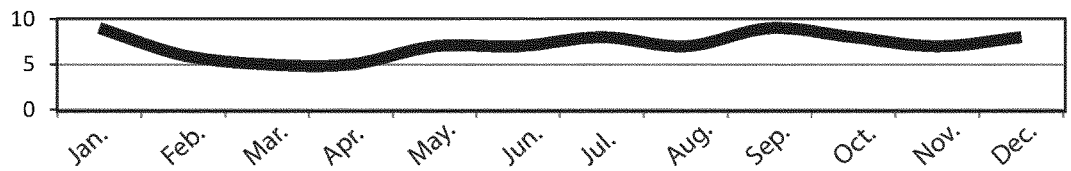

A chart for the "Recent Network Trends" model is represented in FIG. 5. There are seasonal trends in contacting customer care into the overall model; these are based on the operator's own statistics broken down by the customer segment. So, for our example the "Seasonal Trends" in his segment might be as shown in FIG. 6.

For all these models (except the Seasonal Trends above), the value for the test customer for 'May' is extrapolated, using a Lagrange Polynominal extrapolation of this data. Each of the extrapolated values is then multiplied by the weighting and is normalized. Finally each sub-model value is then added together to provide a customer care call propensity value for that customer for May. Depending on the value derived he may be rated as a highly likely to call, not likely to call or medium likelihood.

The other propensity models are built up using a similar algorithm with a different set of building blocks for each propensity model.

Segmentation Models Used within the Propensity Models

One of the building blocks in the propensity models is the correct segmentation of users. The system 1 has the ability to provide fine-grained segments based on billed data (and customer profile information capture), i.e. to clearly differentiate between a young high usage user or an older married person who is an infrequent user.

To build these segmentation models the systems 4 process data concerning usage, charging, profile and purchase history over time to determine variables, and then combine these variables to assign a customer to one of particular set of customer segments.

For example, a segment model may use the following data:

| Segment | Data Usage Average | Voice Calls Average |
| --- | --- | --- |
| Male <25 | 1000 MB | 230 Min |
| Family Plan | 300 MB | 1200 Min |
| Senior Female | 100 MB | 800 Min |

Each individual component of a segmentation model generates a 'confidence factor for a variable (e.g. 30% confidence based).

Real-time Decisioning Based on Context from Sources

Figure 7:
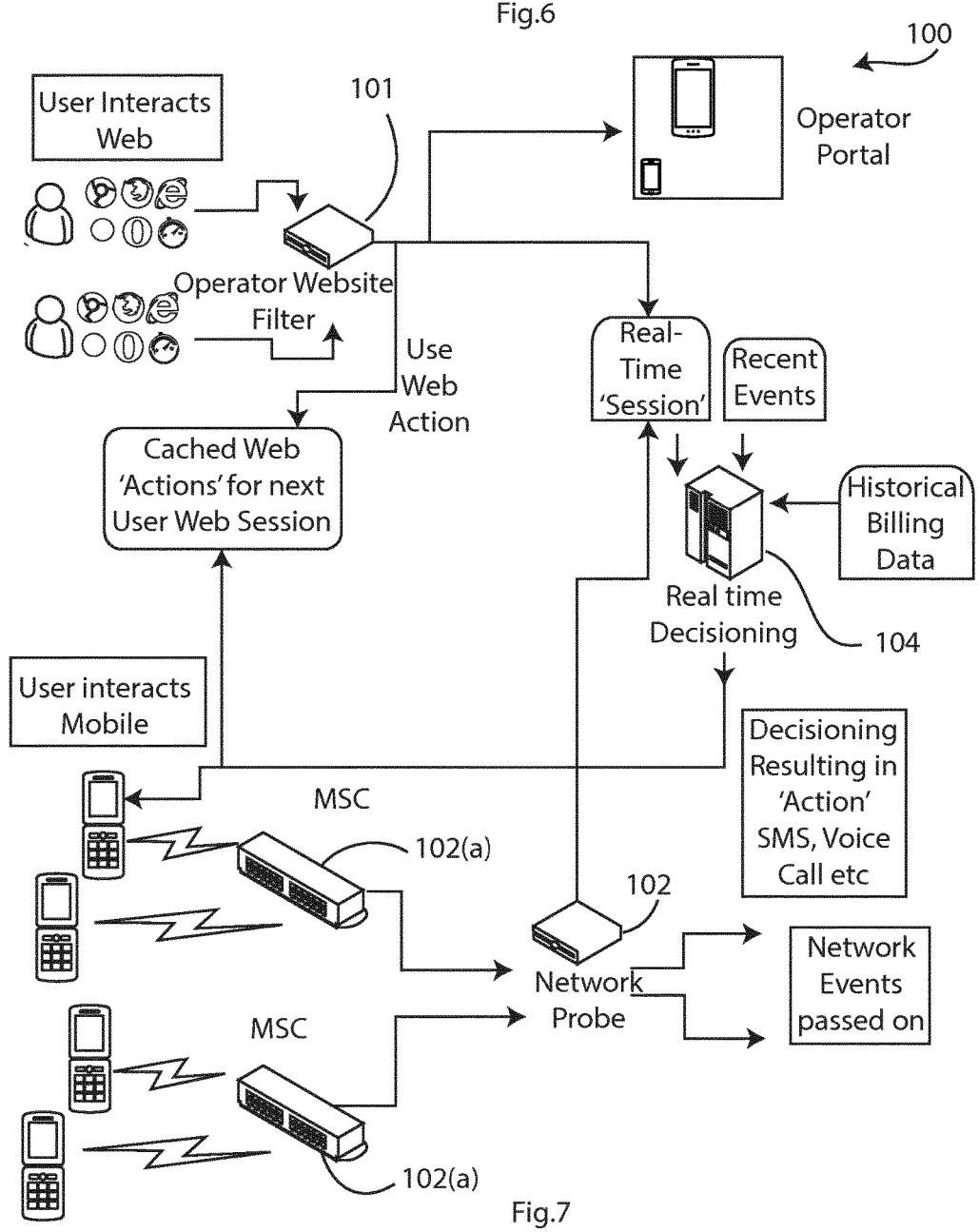
FIG. 7 is a block diagram of a system of the invention capable of real-time automatic decisioning.

In this embodiment, there are three sources, namely current user sessions, the users' recent interactions, and historical billing data stored for the user. Real time decisioning may in one embodiment be performed by a system 100 shown in FIG. 7. This includes:

a Web site filter 101;
a mobile network probe 102 linked with MSCs 102(*a*);
a real time decisioning server 104.

These components could respectively be implemented by the components 2, 3 and 5 of the system 1. The decisioning server 104 may be part of the controller 5 of the system 1, for example.

The system 100 intercepts user events across a number of channels (Mobile, Web, possible Paper), using MSC Probes, HTTP filters and call centre tracking, when particular 'actionable' events are recognised (call to the Telco sales office, access to an issue submission form, etc.) the system would immediately recommend based on decisioning rules at visible/audible 'messaging' relevant to the current session, recent user interactions and historical billing data.

The server 104 breaks a decision into variables which are defined in real time within the context of a user interaction across multiple channels. Multiple sources provide real time values that are then evaluated at the earliest possible stage of user interaction (and in some cases pre-empting) so that users can be presented with relevant and contextual information. Such sources may include the current user sessions (possibly across multiple devices), the user's recent interactions, and historical billing data stored for the user.

Decisioning is based on rules made of 'facts' defined in an ECMA script like syntax.

For example:

if (DecisioningExpression) HandleDecision

Where (DecisioningExpression) is a Boolean expression which contains compound variables (called Facts) joined by logical operators (and, or, not) and comparison operators (>, <, >=, <=, ==).

Facts are defined as variables which for the purposes of this patent are defined in real time.

The overall Decisioning expression can be evaluated either at the start of a user interaction or in the case of notifications, before a user is notified and therefore pre-empting and predicting user behaviour.

For example:

EndOfContract=>(User.contractDueDate>(Time.now—7)) and (Bill.billingDueDate>Time.now) and (Customer.highValueUser)

This will cause an "EndOfContract" decision to be evaluated for all users which are within 7 days of their contract due date but where their most recent bill is due. This decisioning is evaluated in real time to trigger further systems to, for example, prepare a 'special offer' for this user.

A major aspect involved is real time updating of 'facts'. This involves intercepting user events across a number of channels (Mobile, Web and during backend batch processing e.g. bill ingestion). The valid mechanisms for capturing these events are SS7 MSC Probes, HTTP filters and call centre tracking, when particular actionable events are recognised (call to the telco sales office, access to an issue submission form, etc.). A customer can dial a customer center and before the agent answers the phone, the decisioning engine 104 can evaluate various business rules (and the associated 'facts') and evaluate how best to handle the customer's complaint.

The system 100 automatically uses the data gathered both in real time (from the network probes) and previously (e.g. with the propensity modelling patent and other business processes) to cause real-time 'decisioning'/messaging to an operator's customers:

1. User on their mobile or on the operator's Website interacts
2. Filter user events using network probe (on mobile) or if the user is browser an operators portal via the Web
3. Take these events into the decisioning engine which uses pre-calculated models for recent interactions and historical data mixed with real time session facts. A real time 'fact' might be the number being dialled or the particular part of the Web site being accessed.
4. Depending on the result of the evaluation the system may action an unsolicited event back to the user, e.g.an outbound call, SMS message or on the Web a 'special offer' might be pushed (and cached) for the users next web interaction.

To handle this processing at scale the server 104 has an eventual consistent distributed cache of derived facts where 1000's of facts about a user can be loaded and utilised in real time during the processing of a user interactive event. A single node can update the cache in real time (without delay) and the updated value will percolate around the cache until all nodes are consistent.

This mechanism has major advantages within the telecoms environment, allowing massive scale but without causing any delay (or latency) in the processing of telecoms events. This cache is designed using the principle of eventual consistency, whereby the requirement for cache consistency is relaxed so that client updates do not need to be transactional across a cluster of nodes. Eventual consistency means that where possible all nodes within a distributed cluster are updated 'eventually'. This requires not synchronisation between nodes and therefore no latency/delay, but requires particular code to understand that the values of the facts may be out of date while the nodes are being made 'consistent' in the background. This technique allows the benefits of a distributed cache without affecting the real-time requirements of network nodes.

Cache of Decisions

To guarantee performance the server 104 only applies decisioning rules on a pre-filtered sub-set of the overall consumer base. The cache component utilizes a single level of caching (unlike the propensity modelling). Once the system reads a number in the cache, it removes it so that the user does not get multiple decisioning rules, though he may go back into cache again, if for example, the decisioning engine decides he should still receive a different 'decisioning' message on his next contact.

Figure 8:
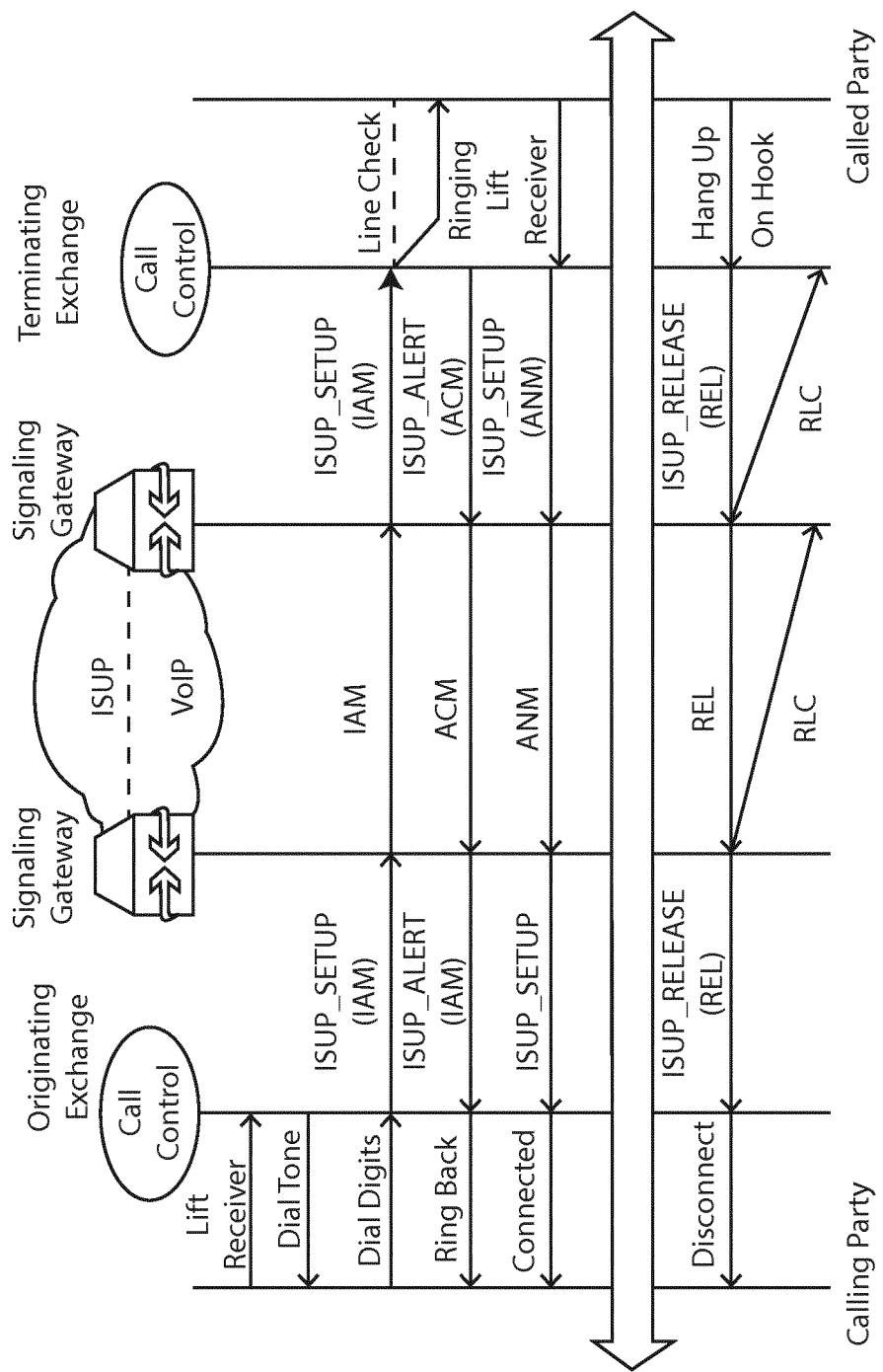
FIG. 8 is a message sequence diagram illustrating message transfers for operation of the system in one embodiment.

Real-time Event Detection Via Network Probe (FIG. 8)

The system 100 uses passive telecoms network monitors to capture users 'events'. Specifically, on a telecoms network it can use a MAP extension to the SS7 signalling standard, TI-SCCP or SIGTRAN, to plug in filters directly into the signalling network. The system decodes at the request 'A' number and for particular 'B' numbers (e.g. Customer Care number), for 'B' the systems are configured to monitor a set of numbers. Once the probe sees these patterns it the system then immediately look up the decisioning cache and look for message (or similar decision e.g. route a customer through to customer sales).

The system uses passive telecoms network monitors to capture user events. Specifically, on a telecoms network it can use MAP extension to the SS7 signalling standard, TI-SCCP or SIGTRAN, to plugin filters directly into the signalling network. The system decodes the SS7 requests 'A' number and for particular 13' numbers (e.g. Customer Care number), specifically for the 'B' numbers it is configured to monitor a set of values. With SS7 probes it is vital to not cause any delays within the processing of the events. Therefore, the system SS7 trigger can load a customer's facts into the cache (if it is not already in the cache) on one SS7 event to prepare the cache for subsequent SS7 events for the same user, for example during ISUP_SETUP(IAM) so that the cache is loaded during ISUP_SETUP(ANM. A typical SS7 interaction is shown FIG. 8.

Real-time Event Detection Via Web Filters or Web Log Parsing

There are specific Web filters for Apache (for capturing all web traffic coming into an organizations web site). This filter has a configuration which recognizes a connecting user (e.g. via a session cookie) and based on the user interacting with aspects of the website which indicate an update to a decisioning rule. For example, if the user is interacting with the pricing pages on the website, this filter can pass this information onto update the decisioning to show a pre-configured message for that user. This capturing on the interactions can also happen via Web log parsing (though not in real-time).

Similar to the network probe processing, the initial access for a user can pre-load the distributed cache with user facts and can then subsequently trigger in real-time decisions for that user. So, if a customer accesses the telco's website the system can immediately evaluate the users facts and any decisions that trigger can for example direct specific messaging for that user or could be utilised to send a SMS, Smartphone Notification or Email pre-empting the user later interaction with other pages within the website.

Distributed Decisioning Engine 104

Decisioning is about selecting messaging for the user based on a number of inputs (including the propensity model described above). Some decisions can be 'simplistic', i.e. if the customer was just talking to customer care, make sure the next message he sees is a 'How can we help you' message. The real-time nature of decisioning is very advantageous.

Event-Based Sentiment Analysis

Either of the systems 1 and 100 may have functionality for additionally performing event-based sentiment analysis. In one embodiment a system 1000 shown in FIG. 8 is used. It comprises a sentiment analysis server 1001 which receives inputs from an analysis database 1002, in turn fed by a probe 1003 linked with MSCs 1003(a). The sentiment analysis server 1001 is also fed by a user profile database 1004.

The system 1000 captures the sentiment of users based in the analysis of real-time events captured by utilizing a probe on the network. Each user who calls customer care or where a drop call is detected (or other events) will be given a real-time scoring, when the number of events within a timeframe exceeds a pre-determined threshold. The Sentiment analysis module 1001 registers a change in sentiment for that customer. This sentiment is then utilized in real-time across three channels Web, mobile, and paper.

Figure 9:
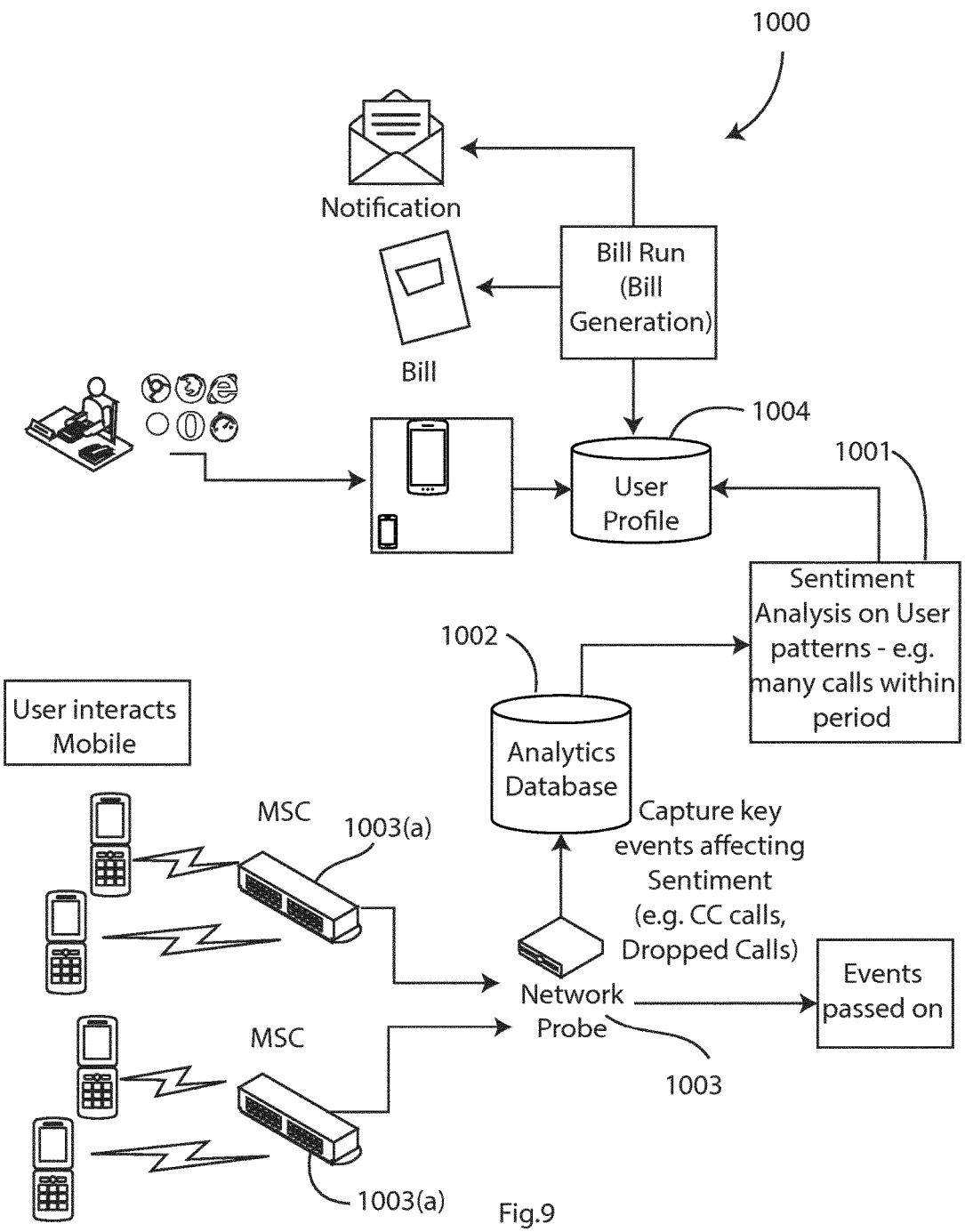
FIG. 9 is a block diagram of a system of the invention for automatically performing event-based sentiment analysis.

The sequence for FIG. 9 is as follows:
1. User makes call (or accesses any channel) to call customer care
2. Network probe (or filter on other channels) detect specific event(s)
3. For users being analysed the event is captured
4. This triggers the sentiment analysis to evaluate whether to recalculate the customers sentiment
5. This sentiment is then used with the three channels to manipulate the bill presented on the web or a paper bill generated.

Each event is filtered and analysed, and if relevant for sentiment is assigned a weighting of −1 to +1, where −1 is negative and +1 is positive. The weighting is based on the temporal distance (d) of the event time (e) from the current time (t), and the relevance is represented by $a^1 * 1/(t-e^1)$. The sum of these events and weightings is stored for each user, with the time (t) left as a variable. More positive recent events therefore mean a larger value for sentiment and more negative redent events mean a larger negative value for sentiment. Newer events have higher weightings than older events. So, for example, newer events with high positive scoring can quickly cancel out older events with high negative values.

Real-time Network Sentiment Analysis

Using an event-driven asynchronous analytics database, events captured via a network probe are first fed into the asynchronous analytics DB, then periodically (e.g. every five to ten minutes) a map-reduce task looks to changes to the overall sentiment scoring, using a temporal averaging algorithm which applies higher weighting to more recent events. Events are not limited to network only events and are combined intelligently with Web/Mobile and even Paper analysis of customer sentiment. The events may include but are not limited to calls to particular key numbers (customer care, sales), network events 'dropped' calls, roaming calls etc.

The result of this scoring is a summary score in various categories. This result is stored within the analytics database 1002 and can be used in a variety of ways.

Real-time Web Filtering Sentiment Analysis

In parallel to the network filtering, a key aspect of the sentiment analysis is to gauge a particular user's sentiment by analysing their patterns of access over time. Therefore, a user getting a high proportion of dropped calls (detected via the network probe) followed by a call to customer care and/or access to a help/support pages on the web or mobile site. Therefore, the filtering of what pages are accessed by the same user may indicate a change in sentiment. Similarly, a paper bill may have messaging which can cause either the website or the phone system to be access (e.g. to avail of a special offer) therefore indicating a possible change in sentiment.

This Web filtering component filters for a particular subset of the overall user base and logs access to a particular http URL's on the Web sites which are filtered. Particular key indicator pages are tracked to indicate the overall sentiment of users.

Overall sentiment analysis is based on a macro-level change in sentiment across the whole customer base. The system uses a smaller sample set to detect and evaluate changes in overall sentiment scores in real-time.

The invention is not limited to the embodiments described but may be varied in construction and detail.

The invention claimed is:

1. An analysis system comprising:
   passive data probes;
   a filter configured to perform real time filtering of data from the passive data probes to provide key event data representing key events for interaction of subscribers with an organisation on a plurality of communication channels; and
   a processor configured to:
   receive said key event data;
   process said key event data to generate subscriber analysis data, including:
      use said key event data and data from data stores for historical billing data and subscriber profiles to generate said subscriber analysis data,
      wherein a plurality of caches of a distributed cache are used for processing the key event data, wherein said caches include a first cache for a portion of the key event data received during a most recent configured time period, and at least one second cache for another portion of the key event data which has been centrally filtered as being relevant for analysis, wherein the portion of the key event data from the first cache is transferred to the second cache according to level of a parameter rising above a threshold;
   identify facts from the key events;
   maintain in the distributed cache the facts; and
   perform eventual consistency whereby all processing nodes within a distributed cluster of processing nodes are updated at a point in time, wherein the processor is configured to detect that values of facts may be out of date while the caches are being made consistent in the background.

2. The analysis system as claimed in claim 1, wherein said key events are events which contribute to propensity of a subscriber to take an action selected from a group of configured actions and the processor is configured to generate and maintain predictive models, at least some of said predictive models being propensity models modeling propensity of users to perform said actions.

3. The analysis system as claimed in claim 1, wherein at least a portion of the passive data probes are mobile network probes and are configured to use a MAP extension to a signalling standard level.

4. The analysis system as claimed in claim 1, wherein the passive data probes and/or the filter are configured to detect as being indicative of events:
sequences of characters, session cookies, and requests to particular Web pages.

5. The analysis system as claimed in claim 1, wherein the processor is configured to refresh the second cache from a subscriber profile database.

6. The analysis system as claimed in claim 2, wherein at least some of the predictive models are per-subscriber.

7. The analysis system as claimed claim 1, wherein at least some of the predictive models are tree-structured with inter-linked nodes.

8. The analysis system as claimed in 1, wherein the processor is configured to recognize as a key event a subscriber interacting with pages within a Web site, and to consequently determine that an update is required to a decisioning rule.

9. The analysis system as claimed in claim 8, wherein the processor is configured to automatically provide a pre-configured message for that subscriber.

10. The analysis system as claimed in claim 9, further comprising a subscriber profile database, and the processor is configured to monitor said key event data to identify events indicative of subscriber sentiment.

11. The analysis system as claimed in claim 10, wherein the processor is configured to generate per-subscriber trends, in which more recent events have higher applied weightings than older events.

12. The analysis system as claimed in claim 11, wherein the processor is configured to quantify sentiment of a subscriber.

13. The analysis system as claimed in claim 12, wherein the processor is configured to trigger actions when sentiment levels reach thresholds.

14. The analysis system as claimed in claim 13, wherein the processor is configured to filter incoming events in real time to determine if they give rise to a need to re-calculate a sentiment level.

15. The analysis system as claimed in claim 14, wherein said filtering includes applying a relevance weighting.

16. The analysis system as claimed in claim 15, wherein the processor is configured to generate a sentiment analysis output for a full organization.

17. A non-transitory computer readable medium comprising code executable by a processor to perform a method comprising:
performing, by a filter, real time filtering of data from passive data probes to provide key event data representing key events for interaction of subscribers with an organization on a plurality of communication channels;
receiving, by a processor, said key event data;
processing, by the processor, said key event data to generate subscriber analysis data, including:
use said key event data and data from data stores for historical billing data and subscriber profiles to generate said subscriber analysis data,
wherein a plurality of caches of a distributed cache are used for processing the key event data, wherein said caches include a first cache for a portion of the key event data received during a most recent configured time period, and at least one second cache for another portion of the key event data which has been centrally filtered as being relevant for analysis, wherein the portion of the key event data from the first cache is transferred to the second cache according to level of a parameter rising above a threshold;
identifying, by the processor, facts from the key events;
maintaining, by the processor, in the distributed cache the facts; and
performing, by the processor, eventual consistency whereby all processing nodes within a distributed cluster of processing nodes are updated at a point in time, wherein the processor is configured to detect that values of facts may be out of date while the caches are being made consistent in the background.

18. The analysis system as claimed in claim 1, wherein the processor is further configured to:
use billing and profile data of the subscribers along with the user events detected by the passive data probes to generate predictive outputs including propensity of a user to churn, upgrade, and buy additional services or products.

19. The analysis system as claimed in claim 1, wherein the eventual consistency is applied to the plurality of caches, whereby the plurality of caches provide a particular code to indicate when the values of facts are out of date for use when the plurality of caches are not synchronized.

* * * * *